(12) United States Patent
Yamada et al.

(10) Patent No.: US 8,647,197 B2
(45) Date of Patent: Feb. 11, 2014

(54) STORAGE MEDIUM STORING GAME PROGRAM AND GAME APPARATUS

(75) Inventors: Yoichi Yamada, Kyoto (JP); Mitsuhiro Takano, Kyoto (JP); Masatoshi Ogawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1988 days.

(21) Appl. No.: 11/708,583

(22) Filed: Feb. 21, 2007

(65) Prior Publication Data

US 2008/0113792 A1   May 15, 2008

(30) Foreign Application Priority Data

Nov. 15, 2006   (JP) .................................. 2006-308592

(51) Int. Cl.
  *A63F 13/00*  (2006.01)
(52) U.S. Cl.
  USPC .................... 463/30; 463/31; 463/32; 463/36
(58) Field of Classification Search
  USPC .......................................... 463/30, 31, 32, 36
  See application file for complete search history.

(56) References Cited

U.S. PATENT DOCUMENTS

| | | | | |
|---|---|---|---|---|
| 6,175,366 | B1 * | 1/2001 | Watanabe et al. | 345/422 |
| 6,283,857 | B1 * | 9/2001 | Miyamoto et al. | 463/31 |
| 6,409,597 | B1 * | 6/2002 | Mizumoto | 463/31 |
| 2002/0039109 | A1 * | 4/2002 | Mamiya et al. | 345/667 |
| 2002/0065133 | A1 * | 5/2002 | Nagayama | 463/32 |
| 2003/0186741 | A1 * | 10/2003 | Hayashida et al. | 463/31 |
| 2005/0202870 | A1 * | 9/2005 | Kawamura | 463/36 |

FOREIGN PATENT DOCUMENTS

| | | |
|---|---|---|
| JP | 11-146978 | 6/1999 |
| JP | 11-207029 | 8/1999 |
| JP | 2000-322591 | 11/2000 |

* cited by examiner

*Primary Examiner* — Paul A D'Agostino
*Assistant Examiner* — Brandon Gray
(74) *Attorney, Agent, or Firm* — Nixon & Vanderhye, P.C.

(57) ABSTRACT

A game apparatus includes a CPU, and displays on a monitor a scene viewed from a virtual camera moving in a virtual game space. In the game apparatus, an aspect ratio of an image to be displayed on the monitor is acquired, and a moving speed of the virtual camera is set based on the aspect ratio. For example, a visual field of the virtual camera is set based on the aspect ratio, and as the image is laterally longer with respect to a longitudinal thereof, the visual field in a crosswise direction is made wider, and therefore a crosswise moving speed of the virtual camera is made smaller.

8 Claims, 10 Drawing Sheets

(A)

NORMAL SCREEN (4:3)

WIDE SCREEN (16:9)

(B)

(A)

(B)

STORAGE MEDIUM STORING GAME PROGRAM AND GAME APPARATUS

CROSS REFERENCE TO RELATED APPLICATION

The disclosure of Japanese Patent Application No. 2006-308592 is incorporated herein by reference.

TECHNICAL FIELD

The exemplary embodiments disclosed herein relate to a storage medium storing a game program and a game apparatus, and particularly relate to a storage medium storing a game program and a game apparatus controlling a moving speed of a virtual camera.

A conventionally known technique is such that a movement of a view point in a virtual space is controlled in accordance with a progress of a game. In the technique disclosed in the document 1 (Japanese Patent Laying-Open No. 2000-322591), the moving speed of a virtual view point is controlled in accordance with a distance between an object and the virtual view point. Specifically, in the game of extinguishing a virtual flame (object) displayed on a monitor, it is controlled so that the moving speed of the virtual view point lowers in the vicinity of the flame being a target. In addition, the virtual view point is moved along a prescribed path (route), and the moving speed thereof is changed in accordance with a shape of the path, irrespective of existence/non-existence of the target. For example, a maximum value of the moving speed is made large in a linear path, and the maximum value of the moving speed is made small on a curved line or in the vicinity thereof.

Also, in the technique disclosed in the document 2 (Japanese Patent Laying-Open No. 11-207029), a position of the view point is controlled in accordance with a situation of a character operated by a player. Specifically, the view point is set behind and on a little upper side of a vehicle (character) and is moved along designated positions set in a world coordinate system. The designated position nearest to the character is set to be 0 point and the designated position farthest to the same is set to be 500 points. Then the designated position of the view point is set depending on whether a view point condition is satisfied or not, and when the present position of the view point is different from the designated position at the time of satisfying the view point condition, the view point is moved at a moving speed set by the number of points per one frame. For example, in a case of crushing, the view point is brought in the closest approach to the vehicle to the designated position of 0 point at a speed of 4 points/frame, in a case of approaching an obstacle, the view point is quickly approached to the vehicle to the designated position of 35 points at a speed of 10 points/frame, and in a case of spinning, the view point is set apart from the vehicle to a far position to the designated position of 300 points at a speed of 3 points/frame.

Further, in the technique disclosed in the document 3 (Japanese Patent Laying-Open No. 11-146978), the view point is set so as to follow a bike operated by a player, with a point upward and backward in a diagonal direction of the bike set as a reference position, and the position of the view point is moved, using a speed component of the bike as a control function. Specifically, when a forward speed (in a Z-axial direction) of the bike increases, the view point is moved in a direction of being separated from the bike. When the bike has the speed component in a lengthwise direction (in a Y-axial direction), the view point is moved in a direction opposite to a vector direction of the speed component in the Y-axial direction. Further, when the bike moves in a crosswise direction (in a X-axial direction) at a prescribed speed, the view point is moved in a direction opposite to the crosswise speed component of the bike.

In the game apparatus disclosed in the aforementioned each document, the moving speed of the view point is controlled in accordance with a state of the object and a game phase. However, the moving speed of the view point is not controlled in accordance with an aspect ratio of a screen shown in a display. Generally, 4:3 (normal) and 16:9 (wide) are given as examples of the aspect ratio of the screen. The screen of 16:9 is laterally longer with respect to a longitudinal thereof than the screen of 4:3, and therefore an amount of information in a width direction of the screen is increased. Therefore, in the screen of 16:9, if the view point is moved (particularly movement so as to turn around in a crosswise direction) at the same speed as that in a case of 4:3, an image of an edge part of the screen moves more quickly, thus involving a problem that it becomes difficult to observe the image.

Therefore, a feature of certain exemplary embodiments is to provide a novel storage medium storing a game program and game apparatus.

Another feature of certain exemplary embodiments is to provide a storage medium storing a game program and a game apparatus capable of setting a moving speed of a view point in accordance with a screen ratio.

Certain exemplary embodiments have the following construction in order to solve the above-described problems. It should be noted that reference numerals and footnote, etc. which are enclosed in parentheses show only one example of correspondences with the exemplary embodiments described herein in order to aid in the understanding of these certain exemplary embodiments and are not intending to be limiting in any way.

A first exemplary embodiment provides a storage medium storing a game program executed in a computer of a game apparatus for displaying on a display means a scene viewed from a virtual camera moving in a virtual space. The game program makes the computer execute an image ratio acquisition step, a moving speed setting step, a movement control step, and an image generation step. The image ratio acquisition step acquires an aspect ratio of an image to be displayed on the display means. The moving speed setting step sets a moving speed of the virtual camera based on the aspect ratio. The movement control step controls a movement of the virtual camera based on the moving speed. The image generation step generates an image showing a range of a visual field of the virtual camera controlled by the movement control step.

In the first exemplary embodiment, the game program is executed in computer (36 and 42) of a game apparatus (12), and the scene viewed from the virtual camera moving in the virtual space is displayed on the display means (34). In the image ratio acquisition step (S31), the aspect ratio of the image to be displayed is acquired. In accordance with the aspect ratio thus acquired, the moving speed out of parameters of the virtual camera is set. Namely, in the moving speed setting step (S13), the moving speed of the virtual camera is set based on the aspect ratio. In the movement control step (S19), the movement of the virtual camera is controlled based on the set moving speed. Accordingly, the virtual camera is moved at a speed according to the screen ratio. Then, in the image generation step (S21), the image showing the range of the visual field of the moved virtual camera is generated.

According to the first exemplary embodiment, the moving speed of the virtual camera can be changed in accordance with the screen ratio of the image to be displayed, and the moving speed of the virtual camera can be set to an optimum speed in accordance with the screen ratio.

A second exemplary embodiment provides a storage medium storing a game program according to the first exemplary embodiment. The moving speed setting step sets a turn-around speed as the moving speed of the virtual camera based on the aspect ratio, and the movement control step controls a turn-around of the virtual camera based on the turn-around speed.

According to the second exemplary embodiment, the moving speed of the virtual camera at turning around can be changed in accordance with the screen ratio, thus making it easy to observe the image generated when the virtual camera is turned around.

A third exemplary embodiment provides a storage medium storing a game program according to the first or second exemplary embodiments. The game program makes the computer further execute a visual field setting step of setting the visual field in a crosswise direction different based on the aspect ratio, and the moving speed setting step sets a crosswise moving speed of the virtual camera based on the aspect ratio.

According to the third exemplary embodiment, in the visual field setting step (S33 to S37), a different crosswise visual field can be set based on the aspect ratio, and the crosswise moving speed of the virtual camera can be changed in accordance with the crosswise visual field of the image to be displayed. Therefore, the crosswise moving speed of the virtual camera can be properly set in accordance with a difference in an information amount in the crosswise direction of the image, thus making it possible to easily observe the image displayed when the virtual camera moves in the crosswise direction. For example, when selecting normal or wide as the screen ratio, the visual field in the crosswise direction of the screen can be differentiated, thereby making it easy to observe the movement of the image by changing the crosswise moving speed of the virtual camera.

A fourth exemplary embodiment provides a storage medium storing a game program according to the third exemplary embodiment. The moving speed setting step sets the crosswise moving speed so that a value thereof becomes smaller as a ratio of lateral to longitudinal of the image is larger.

According to the fourth exemplary embodiment, the wider the crosswise visual field of the image to be displayed is, the slower the crosswise movement of the virtual camera can be made. For example, when the virtual camera is turned around, the wider the crosswise visual field is, the more difficult the image of the edge part can be observed, because the image in this part moves more quickly. Therefore, in a wide screen, by reducing a crosswise turn-around speed, the movement of the image can be made easier to observe.

A fifth exemplary embodiment provides a storage medium storing a game program according to the fourth exemplary embodiment. The moving speed setting step includes a lateral ratio calculation step of calculating lateral ratios of the image and a reference image, when longitudinal ratios of the image, the aspect ratio thereof being acquired by the image ratio acquisition step, and the reference image are set to a same value, and calculates the crosswise moving speed based on the two lateral ratios calculated by the lateral ratio calculation step.

According to the fifth exemplary embodiment, the moving speed setting step calculates the moving speed of the virtual camera based on the lateral ratios of the reference image and the set image (S55 and S57). Therefore, a camera moving speed suitable for the screen ratio can be calculated by a simple processing.

A sixth exemplary embodiment provides a storage medium storing a game program according to one of the third to fifth exemplary embodiments. The moving speed setting step further includes a correction step of correcting the crosswise moving speed set based on the aspect ratio, based on a lengthwise angle of the virtual camera.

According to the sixth exemplary embodiment, when the lengthwise angle (X-axial angle) of the virtual camera is changeable, in the correction step (S59), the crosswise moving speed can be corrected to a more appropriate value in accordance with the X-axial angle of the virtual camera. For example, in accordance with a scene such that the virtual camera looks down upon, looks up, or observe from the horizontal direction a gazing point, an appropriate crosswise moving speed can be set.

A seventh exemplary embodiment provides a storage medium storing a game program according to one of the first to sixth exemplary embodiments. The game program further makes the computer execute a visual field setting step of setting a view angle defining the visual field of the virtual camera based on the aspect ratio.

According to the seventh exemplary embodiment, the visual field of the virtual camera can be defined by the view angle in accordance with the aspect ratio, and therefore an appropriate moving speed can be set in accordance with the view angle. The larger the view angle is, the wider the visual field becomes. Therefore, the change of the visual field becomes larger when the virtual camera is moved. Particularly, it becomes difficult to observe the movement of the image of the edge part of the visual field when the virtual camera is turned around. For example, when the view angle is large, by setting the moving speed of the virtual camera small, the change of a visible range (photographic range) can be easily observed.

An eighth exemplary embodiment provides a game apparatus for displaying on a display means a scene viewed from a virtual camera moving in a virtual space. The game apparatus comprises an image ratio acquisition means, a moving speed setting means, a movement control means, and an image generation means. The image ratio acquisition means acquires an aspect ratio of an image to be displayed on the display means. The moving speed setting means sets a moving speed of the virtual camera based on the aspect ratio. The movement control means controls a movement of the virtual camera based on the moving speed. The image generation means generates an image showing a range of a visual field of the virtual camera controlled by the movement control means.

According to the eighth exemplary embodiment, the same advantage as that of the storage medium storing the game program of the aforementioned first exemplary embodiment is exhibited.

According to certain exemplary embodiments, the moving speed of the virtual camera can be appropriately set in accordance with the screen ratio. Accordingly, the image displayed at the time of movement of the virtual camera such as turning around can be made easy to be observed.

The above described features, aspects and advantages of certain exemplary embodiments will become more apparent from the following detailed description when taken in conjunction with the accompanying drawings.

BRIEF DESCRIPTION OF THE DRAWINGS

FIG. 4 is an illustrative view showing a difference in a visible range between a normal screen and a wide screen, wherein FIG. 4(A) shows a generated image, and FIG. 4(B) shows a crosswise visual field defined by a crosswise view angle of a virtual camera;

FIG. 10 is an illustrative view showing an X-axial angle of the virtual camera, wherein FIG. 10(A) shows a case where a view point and a gazing point are horizontal, and FIG. 10(B) shows a case where the view point looks down upon the gazing point.

DETAILED DESCRIPTION

Figure 1:
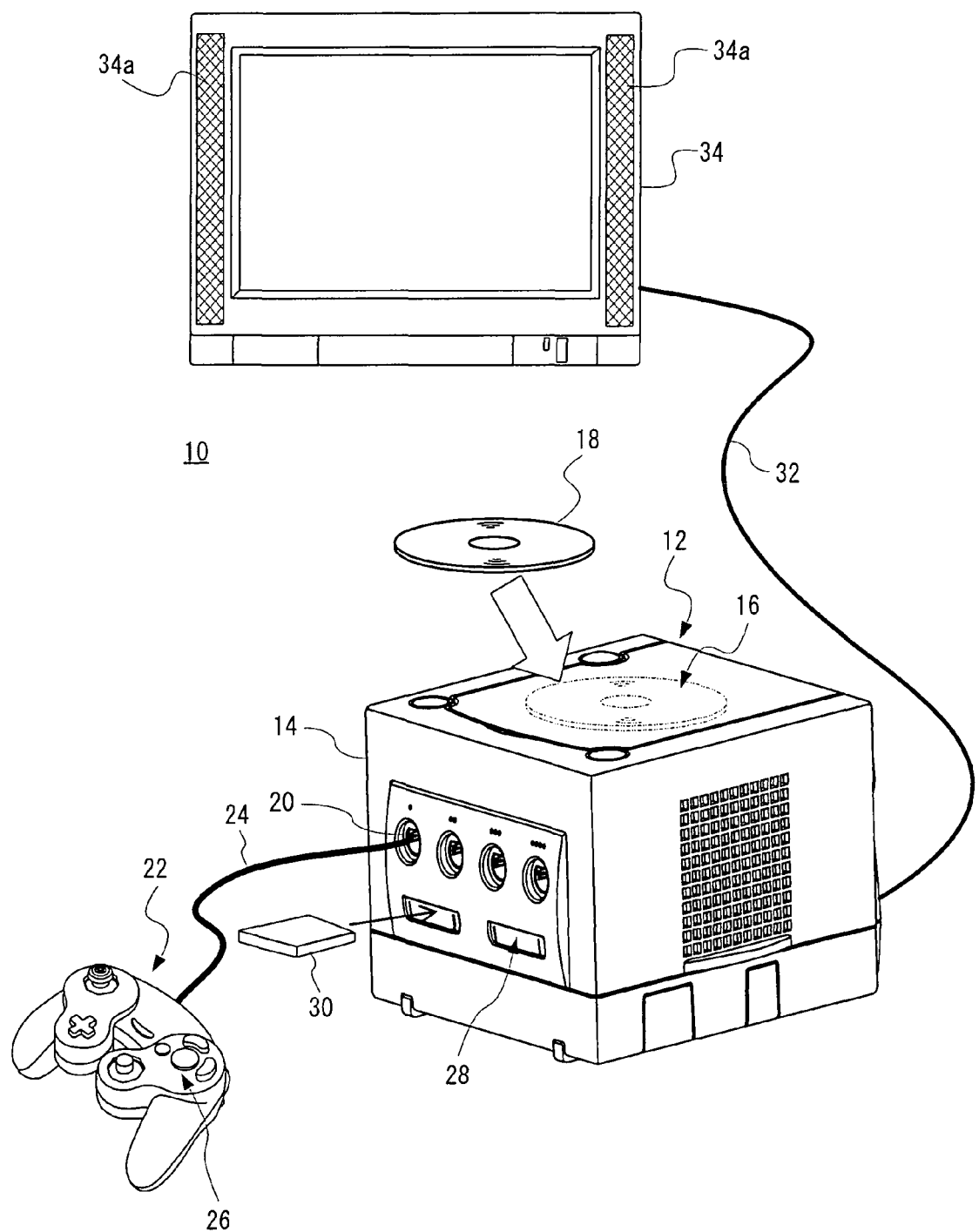
FIG. 1 is an illustrative view showing an outer appearance of a game system of an exemplary embodiment.

Referring to FIG. 1, a video game system 10 of one exemplary embodiment includes a video game apparatus 12. The video game apparatus 12 includes a housing 14, and the housing 14 is provided with an optical disk drive 16 on an upper surface thereof. An optical disk 18 which is one example of an information storage medium storing a game program, and the like is mounted on the optical disk drive 16. The housing 14 is provided with a plurality of connectors 20 (four in this exemplary embodiment) on a front surface thereof. These connectors 20 are for connecting a controller 22 to the video game apparatus 12 by a cable 24, and can connect up to four controllers to the video game apparatus 12 in this exemplary embodiment.

The controller 22 is provided with an operating portion (operating switch) 26 on upper, lower, lateral sides, etc. thereof. The operating portion 26, for example, includes two analog joysticks, one cross switch, a plurality of button switches, and so on. One analog joystick is utilized for inputting a moving direction and/or a moving speed, moving amount, etc. of a player object (a moving image character object, operable with the controller 22 by a player) according to an amount and a direction of an inclination of the stick. The other analog joystick is utilized for controlling a movement etc. of the virtual camera according to a direction of an inclination thereof. The cross switch is utilized for instructing a moving direction etc. of the player object in place of the analog joystick. The button switches are utilized for instructing a motion of the player object, switching a point of view of the virtual camera for the three-dimensional image, adjusting the moving speed of the player object and so on. The button switches, for example, further control a menu selection and a movement of a pointer or a cursor.

It should be noted that the controller 22 is connected to the video game apparatus 12 by the cable 24 integrated into the controller 22 in this exemplary embodiment. However, the controller 22 may be connected to the video game apparatus 12 by another method such as a wireless manner via an electromagnetic wave (radio wave, infrared ray, for example). Furthermore, a detailed structure of the operating portion 26 of the controller 22 is, of course, not limited to the structure of the exemplary embodiment, and can be arbitrarily changed or modified. For example, the only one analog joystick may be utilized, or no analog joystick may be utilized. The cross switch may not be utilized.

At least one or plurality of (two in this exemplary embodiment) memory slots 28 are provided below the connectors 20 on the front surface of the housing 14 of the video game apparatus 12. A memory card 30 is inserted to this memory slot 28. The memory card 30 is utilized for loading the game program, etc. read from the optical disk 18 so as to temporarily store it, or saving game data of the game (result data or progress data of the game) that the player plays by utilizing the game system 10.

The housing 14 of the video game apparatus 12 is provided with an AV cable connector (not shown) on its rear surface. The connector allows a monitor 34 to be connected to the video game apparatus 12 over an AV cable 32. The monitor 34 is typically a color television receiver, and the AV cable 32 inputs a video signal from the video game apparatus 12 to a video input terminal of the color television and inputs a sound signal to a sound input terminal. Accordingly, a game image of a three-dimension (3D) video game, for example, is displayed on the color television (monitor) 34, and a game sound (stereo game sound) such as a game music, a sound effect, etc. is output from right and left speakers 34a.

In the game system 10, a user or a game player first turns on an electric power source of the video game apparatus 12 in order to play a game (or another application), and then selects a suitable optical disk 18 storing a video game (or another application the play wants to play), and loads the optical disk 18 on the disk drive 16 of the video game apparatus 12. In response thereto, the video game apparatus 12 starts to execute the video game or another application on the basis of software stored in the optical disk 18. The player operates the controller 22 so as to apply an input to the video game apparatus 12. For example, the player starts the game or another application by operating any one of the operating portion 26. By moving another of the operating portion 26, it is possible to move the moving image object (player object) in different directions and to change a viewpoint of the user (virtual camera position) in the three-dimensional (3D) game world.

Figure 2:
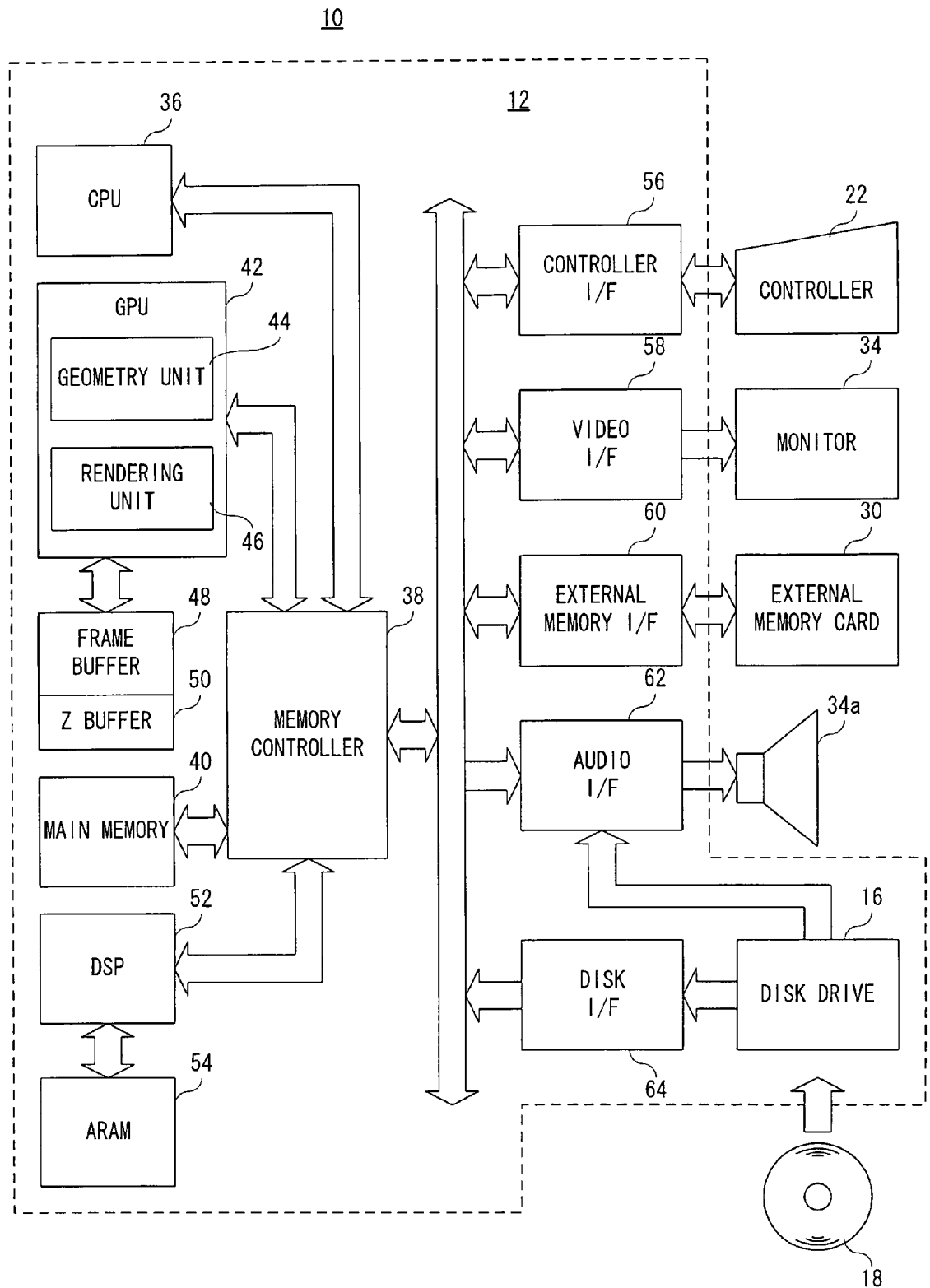
FIG. 2 is a block diagram showing an electrical constitution of the game system shown in FIG. 1.

FIG. 2 is a block diagram showing an electric configuration of the video game system 10 of FIG. 1 exemplary embodiment. The video game apparatus 12 is provided with a central processing unit (hereinafter, may be referred to as "CPU") 36. The CPU 36 is called a computer or a processor, and is in charge of governing overall control of the video game apparatus 12. The CPU 36 or the computer functions as a game processor and is connected with a memory controller 38 via a bus. The memory controller 38 mainly controls writing to and reading from a main memory 40 connected via a bus under control of the CPU 36. The memory controller 38 is connected with a GPU (Graphics Processing Unit) 42.

The GPU 42 forms a part of a rendering means, and is constructed by a single chip ASIC, for example. The GPU 42 receives a graphics command (construction command) from the CPU 36 via the memory controller 38, and, in response to the command, generates the three-dimensional (3D) game image by a geometry unit 44 and a rendering unit 46. Specifically, the geometry unit 44 performs a coordinate operation process such as turn-around or rotation, movement, transformation, etc. of a variety of objects (which is formed by a plurality of polygons, and the polygon is a polygonal plane defined by at least three vertex coordinates) in a three-dimension coordinates system. The rendering unit 46 performs an image generating process such as pasting a texture on each of polygons of the variety of objects, and so on. Thus, three-dimension image data to be displayed on the game screen is created by the GPU 42, and the image data is stored in the frame buffer 48. When a 2D game is executed, a two-dimensional image generated through a game processing is pasted as a texture on rectangular area at a predetermined position within the game space, and then, an image of the area viewed from a predetermined virtual camera is stored in the frame buffer 48. Thus, it is possible to display the 2D game image by the 3D processing.

It should be noted that data (primitive or polygon, texture, etc.) required to execute the construction command is acquired by the GPU 42 from the main memory 40 via the memory controller 38.

The frame buffer 48 is a memory for rendering (storing) one frame of the image data of the raster scan monitor 34, for example, and is rewritten by the GPU 42 every one frame. More specifically, the frame buffer 48 stores color information (pixel value) of the image for each pixel in order. Here, the color information is data as to R, G, B, and A, and is, for example, R (red) data of 8 bits, G (green) data of 8 bits, B (blue) data of 8 bits, and A data of 8 bits. It should be noted that the A data is data utilized as the so-called alpha data or mask data, and is utilized as alpha channel, that is, data indicative of a blend ratio with a color superimposed on the pixel for representing a transparency from clearness to opaqueness, for example. A video I/F 58 described later reads the data stored in the frame buffer 48 via the memory controller 38 to display a 3D game image on the screen of the monitor 34.

Furthermore, a Z buffer 50 has a storage capacity equal to the number of pixels corresponding to the frame buffer 48×the number of bits of depth data per one pixel, and stores depth information or depth data (Z value) of dots corresponding to respective storing positions of the frame buffer 48.

It should be noted that the frame buffer 48 and the Z buffer 50 may be constructed by utilizing a portion of the main memory 40, or may be provided inside the GPU 42.

The memory controller 38 is also connected to a RAM for audio 54 (hereinafter, to be referred as "ARAM") via a DSP (Digital Signal Processor) 52. Accordingly, the memory controller 38 controls the writing to and/or reading from the ARAM 54 as a sub memory in addition to the main memory 40.

The DSP 52 functions as a sound processor, and generates audio data corresponding to a sound, voice or music required for the game by use of the sound data (not shown) stored in the main memory 40 or by use of sound wave form data written to the ARAM 54.

The memory controller 38 is further connected to respective interfaces (I/F) 56, 58, 60, 62 and 64 by buses. The controller I/F 56 is an interface for the controller 22 to be connected to the video game apparatus 12, and applies an operation signal or operation data of the operating portion 26 of the controller 22 to the CPU 36 through the memory controller 38. The video I/F 58 accesses the frame buffer 48 to read the image data generated by the GPU 42 and then, applies the image signal or the image data (digital RGB pixel values) to the monitor 34 via the AV cable 32 (FIG. 1).

The external memory I/F 60 makes the memory card 30 (FIG. 1) which is inserted to the front surface of the video game apparatus 12 communicate to the memory controller 38. This allows the CPU 36 to write and read the data to and from the memory card 30 via the memory controller 38. The audio I/F 62 receives audio data applied from the DSP 52 through the memory controller 38 or an audio stream read from the optical disk 18, and then applies an audio signal (sound signal) corresponding thereto to the speakers 34a of the monitor 34.

The disk I/F 64 connects the disk drive 16 to the memory controller 38, and whereby the CPU 36 controls the disk drive 16. By the disk drive 16, a program, and data read from the optical disk 18 are written to the main memory 40 under control of the CPU 36.

In this game system 10, the scene viewed from the virtual camera moving in the virtual game space is displayed on the monitor 34. In the video game apparatus 12, the screen ratio showing the aspect ratio of the game image (game screen) to be displayed on the monitor 34 is acquired, and the moving speed of the virtual camera for photographing the virtual game space is changed in accordance with this screen ratio.

As is seen in this embodiment, when the game system 10 is realized as a household game apparatus, the monitor 34 connected to the video game apparatus 12 is different in each household, and the aspect ratio of the screen of the monitor 34 is 4:3, for example, in some cases, and 16:9 in other cases. Similarly even in a case where the game system 10 is realized in the form of a personal computer, a mobile phone or a personal digital assistant or the like, the aspect ratio of the screen is made different in accordance with a display device of each equipment. In this game system 10, the visual field of the virtual camera is set in consideration of the difference of the aspect ratio of the game image displayed on the screen, namely, the display range of the virtual game space (visible range or photographic range by the virtual camera) is set. However, even when the display range is simply set so as to be matched to the game image to be displayed, a problem involved therein is that the game image is difficult to be observed in a scene with a movement of the virtual camera. For example, when a game producer determines the moving speed of the virtual camera based on the game image with aspect ratio of 4:3, the edge of this game image moves quickly compared to the game image with aspect ratio of 4:3 if the game image with aspect ratio of 16:9 is formed while the virtual camera is turned around at this moving speed in the crosswise direction, thus making it difficult to observe the game image. Therefore, in order to prevent such a difficulty in observing the game image due to the difference of the screen ratio, in this exemplary embodiment, the moving speed of the virtual camera is set in accordance with the screen ratio.

Figure 3:
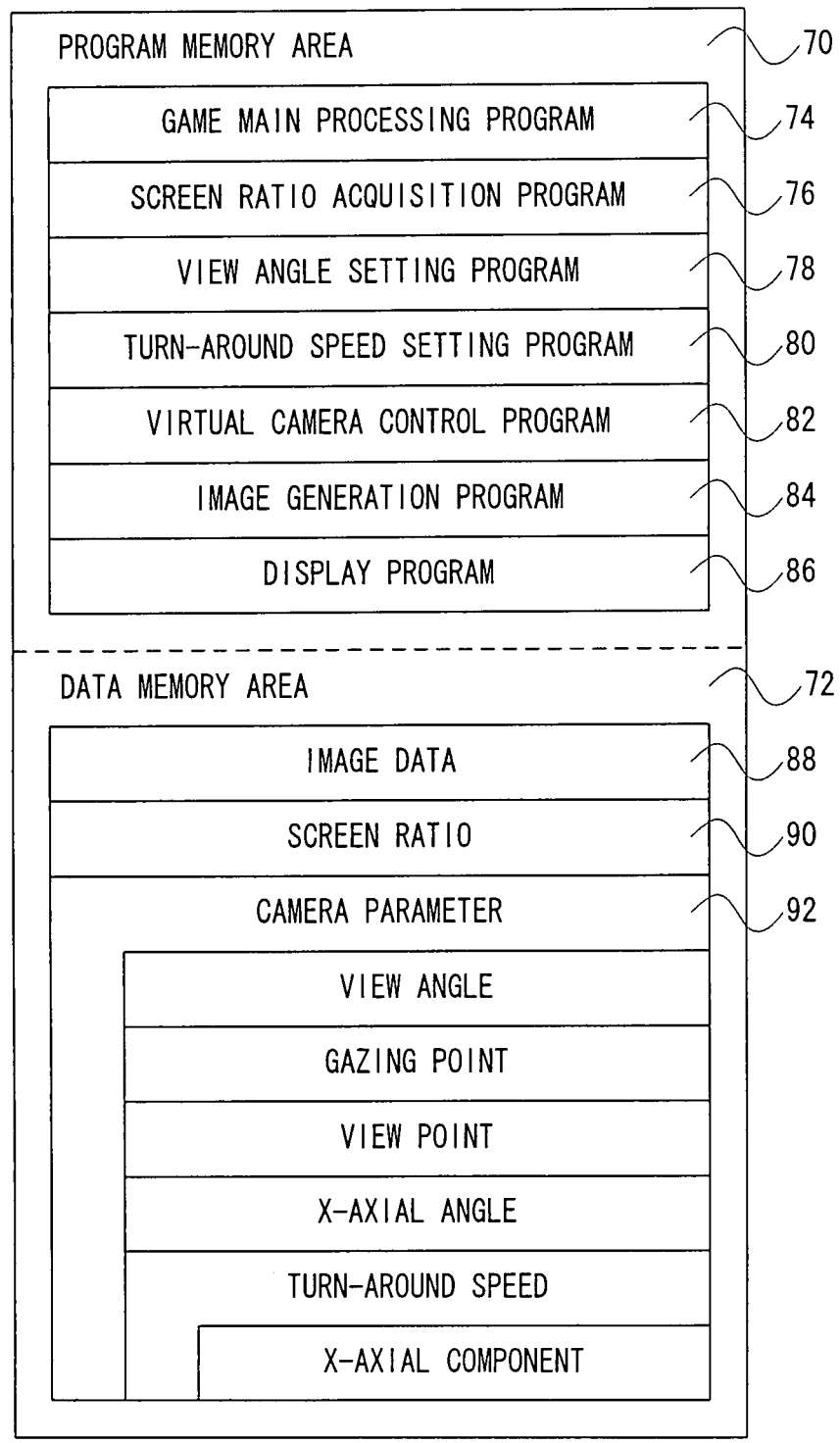
FIG. 3 is an illustrative view showing a memory map of a main memory shown in FIG. 2.

FIG. 3 shows an example of the memory map of the main memory 40. The memory map includes a program memory area 70 and a data memory area 72. The game program and piece of data are totally read at once or partially read as needed and sequentially read from the optical disk 18, and stored in the main memory 40. Note that in FIG. 3, only a part of the memory map is shown, and other program and data required for processing are also stored in the main memory 40.

A game main processing program for processing a main routine of the virtual game of this exemplary embodiment is stored in a memory area 74.

A screen ratio acquisition program is stored in a memory area 76. By this program, the screen ratio showing the aspect ratio of the game image to be displayed on the monitor 34 is acquired. In this exemplary embodiment, a menu for setting the screen ratio is prepared on a menu screen, and a player can input the screen ratio by using a controller 22. For example, when the image showing a scene in the virtual game space is full-screen displayed on the monitor 34, a normal screen (aspect ratio of 4:3) and a wide screen (aspect ratio of 16:9) are selectably displayed on the menu screen, and the player selects the screen ratio in accordance with the screen of the monitor 34 connected to the video game apparatus 12, namely, depending on whether it is the normal screen or the wide screen. Alternatively, a value showing the screen ratio may be set in a state capable of being directly inputted on the menu screen. Note that when the image showing the scene in the virtual space is displayed in a part of the screen of the monitor 34, the aspect ratio of this image is made settable in the menu screen.

Menu setting of this screen ratio is executed in accordance with not the program stored in the optical disk 18 but a menu program previously stored in a ROM or a nonvolatile memory (flash memory, etc.) included in the main memory 40. The screen ratio set in the menu screen is stored in a prescribed area of the nonvolatile memory of the main memory 40. The screen ratio acquisition program reads the set screen ratio from this prescribed area to the screen ratio memory area 90 of the data memory area 72. In other exemplary embodiments, it may be set so that the menu program is stored in the optical disk 18, and in accordance with the menu program read from this optical disk 18, the screen ratio is set based on the input by the player.

A view angle setting program is stored in the memory area 78. In this exemplary embodiment, as described above, in consideration of the difference of the screen ratio, it is determined so that the visual field of the virtual camera, namely, the photographic range of the virtual game space is changed in accordance with the screen ratio. By this view angle setting program, a view angle (field angle) of the virtual camera is set. The view angle thus set is stored in a camera parameter memory area 92 of the main memory 40. When a settable screen ratio is previously determined like the wide screen or the normal screen, etc., for example, a table showing the view angle corresponded to the screen ratio is previously stored, and by referencing this table, the view angle is set. Alternatively, when the screen ratio is inputted, the reference screen ratio (such as 4:3) and the view angle corresponding thereto are previously stored, and based on this reference screen ratio and its view angle, the view angle corresponding to the inputted screen ratio may be calculated.

Figure 4:
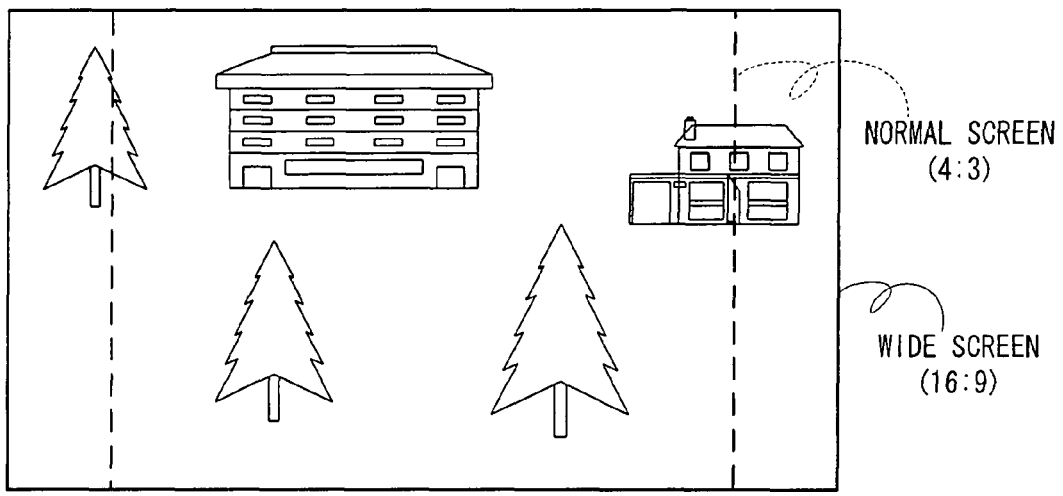
Figure 4:
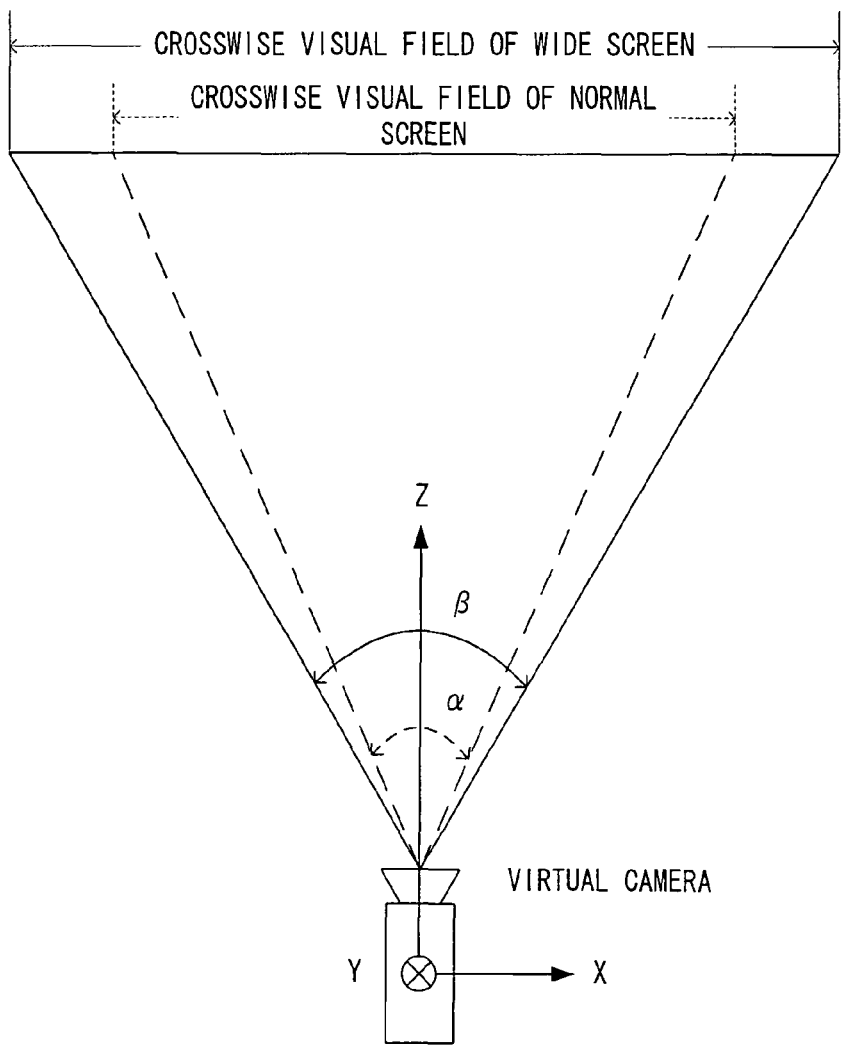

For example, the difference of the visual field between the normal screen and the wide screen is shown in FIG. 4. FIG. 4(A) shows an example of the generated game image, and FIG. 4(B) shows the view angle defining the crosswise visual field of the virtual camera. Note that FIG. 4(B) shows a virtual camera coordinates system (rectangular coordinates system), and a direction of the line of sight of the virtual camera is taken on the Z-axis, a crosswise direction of the virtual camera is taken on the X-axis, and a lengthwise direction of the virtual camera is taken on the Y-axis. View angles $\alpha$ and $\beta$ are angles in the XZ plane of the virtual camera coordinates system.

As shown in FIG. 4(A), when longitudinal lengths of the wide screen (game image of 16:9) and the normal screen (game image of 4:3) are made same, a width in the crosswise direction of the wide screen becomes larger than that of the normal screen. Accordingly, as shown in FIG. 4(B), the visual field in the crosswise direction of the wide screen (visible range or photographic range) can be made larger than the visual field in the crosswise direction of the normal screen. Specifically, the view angle $\beta$ in the crosswise direction of the virtual camera defining the visual field in the crosswise direction of the wide screen is made larger than the view angle $\alpha$ in the crosswise direction of the virtual camera defining the visual field in the crosswise direction of the normal screen. Note that the view angle in the lengthwise direction of the virtual camera is made same. The larger the view angle is, the wider the visual field becomes, and therefore larger view angle allows an amount of information to be increased, and as shown in FIG. 4(A), an object and a background, etc. not observed in a case of the normal screen is displayed on both edges of the wide screen. When the virtual camera is moved, the larger the view angle is, the larger the change of a display range becomes. Particularly, when the virtual camera is turned around in the crosswise direction, as the view angle becomes larger, the displayed information changes quickly on both edges of the game image in the crosswise direction.

Explanation is returned to FIG. 3. A turn-around speed setting program is stored in a memory area 80. In this exemplary embodiment, by this program, the turn-around speed as the moving speed of the virtual camera is set in accordance with the screen ratio. The turn-around speed thus set is stored in the camera parameter memory area 92 of the main memory 40.

Figure 5:
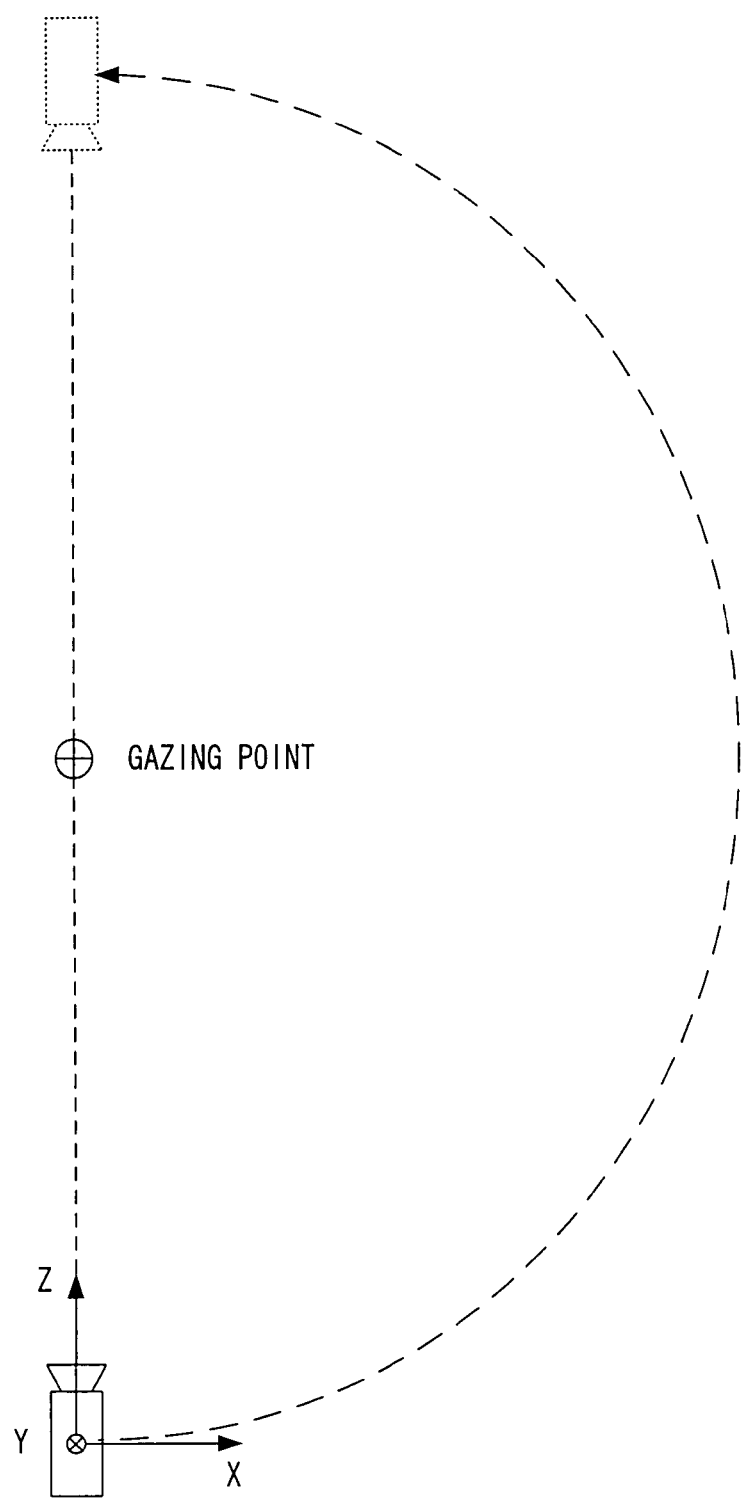
FIG. 5 is an illustrative view showing turn-around of the virtual camera.

As described above, when the information displayed is different in accordance with the screen ratio and the virtual camera is turned around, the information on the edge of the screen changes quickly as the visual filed becomes larger. Therefore, in this exemplary embodiment, particularly the speed for turn-around out of the movement of the virtual camera is set in accordance with the screen ratio. Here, the turn-around of the virtual camera means a movement of a view point rotating around a certain point. In FIG. 5, a rotation around a gazing point is shown as an example of the turn-around of the virtual camera. The virtual camera of FIG. 5 performs half-turn rotation around the gazing point. In addition, since this virtual camera moves in the X-axial direction, with the gazing point as a center, the turn-around as shown in FIG. 5 is expressed as the turn-around in the crosswise direction.

In this exemplary embodiment, as shown in FIG. 4, the normal screen and the wide screen are assumed. The game image for turn-around of the virtual camera in the crosswise direction (the X-axial direction) is significantly influenced by the screen ratio, and therefore FIG. 5 shows the turn-around of the virtual camera in the crosswise direction. Moreover, the movement of the virtual camera as shown in FIG. 5 corresponds to the movement in a case where a tracking camera of a player character turns around in accordance with a turn over of the player character in an inverted direction.

Note that the half-turn rotation is shown in FIG. 5. However, an angle of the turn-around is arbitrary. Further, a center point of turn-around may be a point different from the gazing point. In addition, a center point of turn-around may be fixed or may be moved.

In this exemplary embodiment, by the turn-around speed setting program, an X-axial component of the turn-around speed of the virtual camera is changed in accordance with the screen ratio. Specifically, the turn-around speed is set, so that the speed becomes smaller as the ratio of lateral to longitudinal of the game image is larger. As a width of the game image becomes larger, displayed amount of information is increased. Therefore, when the virtual camera is turned around, an edge part of the game image moves quickly, thereby making it difficult to observe the movement of this image. Accordingly, when the width of the game image is larger, by making the turn-around speed smaller, the movement of the edge can be easily observed.

Note that the turn-around speed may be calculated based on the screen ratio, or a speed value previously determined and stored for each screen ratio may be set as the turn-around speed. Also, in this exemplary embodiment, the turn-around speed is corrected based on a rotating angle around the X-axis of the virtual camera. Details of calculation and setting of the turn-around speed will be described later.

The explanation is returned to FIG. 3. A virtual camera control program is stored in a memory area 82. By this program, the movement of the virtual camera is controlled. In this exemplary embodiment, when it is determined that it is the timing of turn-around, the turn-around of the virtual camera is executed, and the virtual camera is moved based on a set turn-around speed. The turn-around timing is a timing when a prescribed condition is satisfied, such that an operation of changing the direction of the player character is made based on input data from the controller 22, the direction of the player character needs to be changed in accordance with a game situation, or an operation of turning around the virtual camera is made based on the input data from the controller 22.

An image generation program is stored in a memory area 84. The game image showing inside (range) of a visual field of the virtual camera defined by a view angle is generated by this program. A display program for displaying the generated game image on a monitor 34 is stored in a memory area 86.

Image data used for generating the game image is stored in a memory area 88 of the data memory area 72. The image data includes the image data of each kind of object (a player character, a non-player character, a topographic object, a building object, and an item object, etc.) arranged in the virtual game space.

The screen ratio acquired by the screen ratio acquisition program is stored in a memory area 90. Setting of the view angle and setting of the turn-around speed are performed based on this screen ratio.

Camera parameters are stored in a memory area 92. The camera parameters include the information such as view angle, gazing point, view point, X-axial angle, and turn-around speed. The game image is generated by the image generation program based on the camera parameters.

The view angle is set in accordance with the screen ratio by the view angle setting program. The gazing point is the coordinates showing a position of the gazing point in the world coordinates system, and the view point is the coordinates showing the position of the virtual camera in the world coordinates system. For example, when the virtual camera is the tracking camera of the player character, the gazing point is set at the position of the player character, and the view point, for example, is set at the position rearward over a prescribed distance from the player character, and the gazing point and the view point move according to the movement of the player character. In addition, as shown in FIG. 5, when the virtual camera turns around, the view point moves at a crosswise turn-around speed, with a prescribe point (such as a gazing point) as a center.

The X-axial angle (longitudinal inclination angle of the virtual camera) shows a rotation angle of the virtual camera, with the X-axis of the camera coordinates system set as a center (reference). In this exemplary embodiment, as will be described later, the turn-around speed is corrected based on the X-axial angle.

The turn-around speed is the turn-around speed set by the turn-around speed setting program. In this exemplary embodiment, the virtual camera turns around in the X-axial direction, and therefore the X-axial component of the turn-around speed is stored. Note that in other exemplary embodiments, when the turn-around in the direction of the Y-axis, and the turn-around including components in both directions of the X-axis and Y-axis are performed, the Y-axial component of the turn-around speed is also stored.

Figure 6:
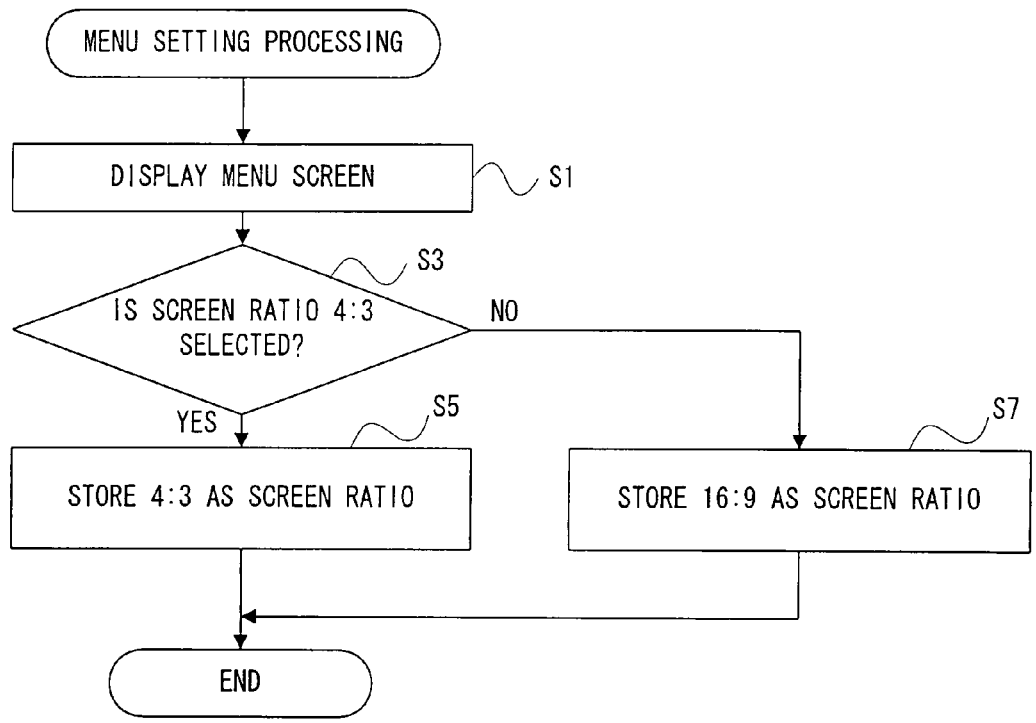
FIG. 6 is a flowchart showing an example of an operation of a menu setting processing.

FIG. 6 shows an example of an operation of a menu setting processing executed by a CPU 36 of the video game apparatus 12. By this menu setting processing, the setting of the screen ratio in the menu screen as described above is performed. As described above, in this exemplary embodiment, the setting of the screen ratio is executed by following the menu program previously stored in the ROM or a nonvolatile memory of the video game apparatus 12.

When the menu setting processing is started, in a step S1, the CPU 36 displays the menu screen on the monitor 34 by using a GPU 42. In the menu screen, for example, the screen ratio 4:3 and 16:9 are displayed as an option, and the player can select the screen ratio by operating a cross switch of the controller 22 to move a cursor to a desired option, and pressing a prescribed button switch.

In a step S3, based on the input data from the controller 22 and positional information of the option, the CPU 36 determines whether or not the screen ratio 4:3 is selected. If "YES" in the step S3, the CPU 36 stores the information showing 4:3 as the screen ratio in a prescribed area of the nonvolatile memory of the main memory 40 for storing the screen ratio. Meanwhile, if "NO" in the step S3, namely, when the screen ratio 16:9 is selected, in a step S7, the CPU 36 stores the information showing 16:9 in the aforementioned prescribed area, as the screen ratio. When the processing of the step S5 or the step S7 is ended, the menu setting processing is ended.

Figure 7:
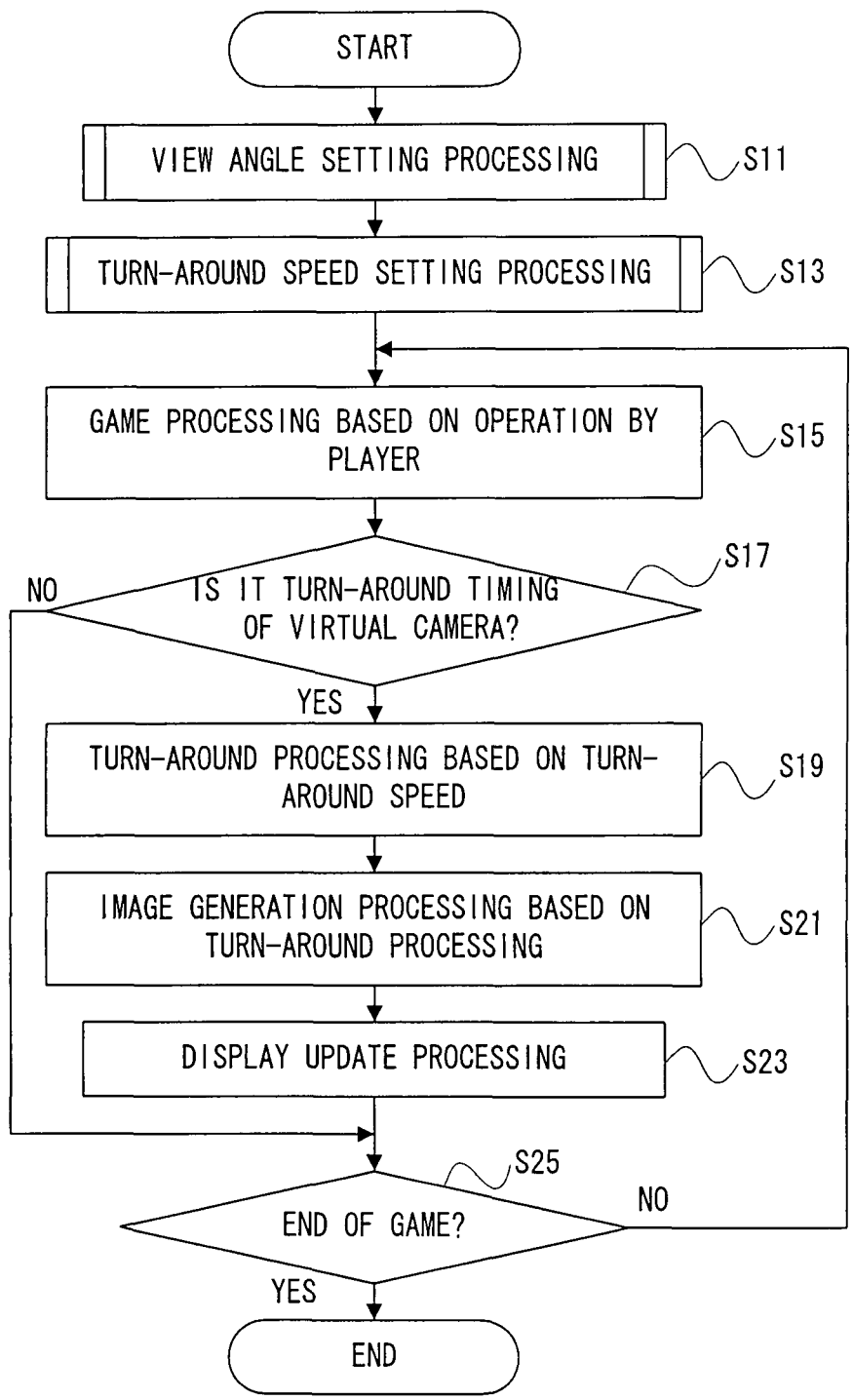
FIG. 7 is a flowchart showing an example of a game operation.

FIG. 7 shows an example of the game operation of the CPU 36 of the video game apparatus 12. First, in a step S11, the CPU 36 executes the view angle setting processing. An operation of the view angle setting processing is shown in detail in FIG. 8.

Figure 8:
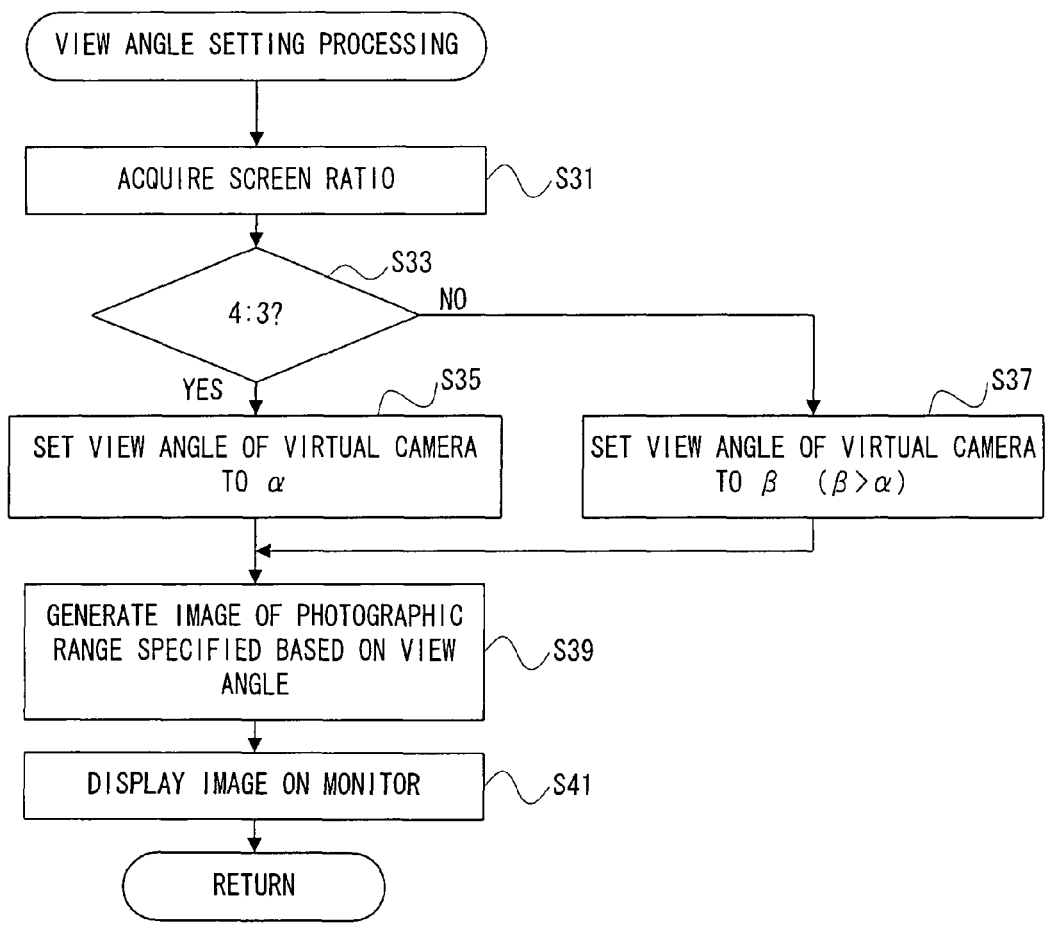
FIG. 8 is a flowchart showing an example of the operation of a view angle setting processing in FIG. 7.

In a step S31 of FIG. 8, the CPU 36 acquires the screen ratio. Specifically, the screen ratio set in the aforementioned menu setting processing of FIG. 6 is read from the prescribed area of the main memory 40, and is stored in a screen ratio memory area 90.

Next, in a step S33, the CPU 36 determines whether or not the screen ratio thus acquired is 4:3. If "YES" in the step S33, in a step S35, the CPU 36 stores a value a for the screen ratio 4:3 in a camera parameter memory area 92, thereby setting the view angle of the virtual camera. Meanwhile, if "NO" in the step S33, in a step S37, the CPU 36 stores a value β for the screen ratio 16:9 in the camera parameter memory area 92, thereby setting the view angle of the virtual camera. As shown in FIG. 4, the view angles α and β define crosswise visual fields of the normal screen and wide screen respectively. The values α and β of the view angle are previously defined based on the screen ratio and stored in a program. Alternatively, the value of the view angle corresponding to the set screen ratio may be calculated based on the view angle (such as α) as a reference corresponded to the screen ratio (such as 4:3) as a reference.

Subsequently, in a step S39, the CPU 36 generates the image showing a virtual game space of a photographic range specified based on the view angle. Then, in a step S41, the CPU 36 displays the generated image on the monitor 34. In this way, the game image showing inside the visual field corresponding to the screen ratio is displayed, and by observing this game image, the player plays the game. When the view angle setting processing is ended, the processing is returned to a step S13 of FIG. 7.

In the step S13 of FIG. 7, the CPU 36 executes the turn-around speed setting processing, and sets the turn-around speed according to the screen ratio. The operation of the turn-around speed setting processing is shown in detail in FIG. 9.

Figure 9:
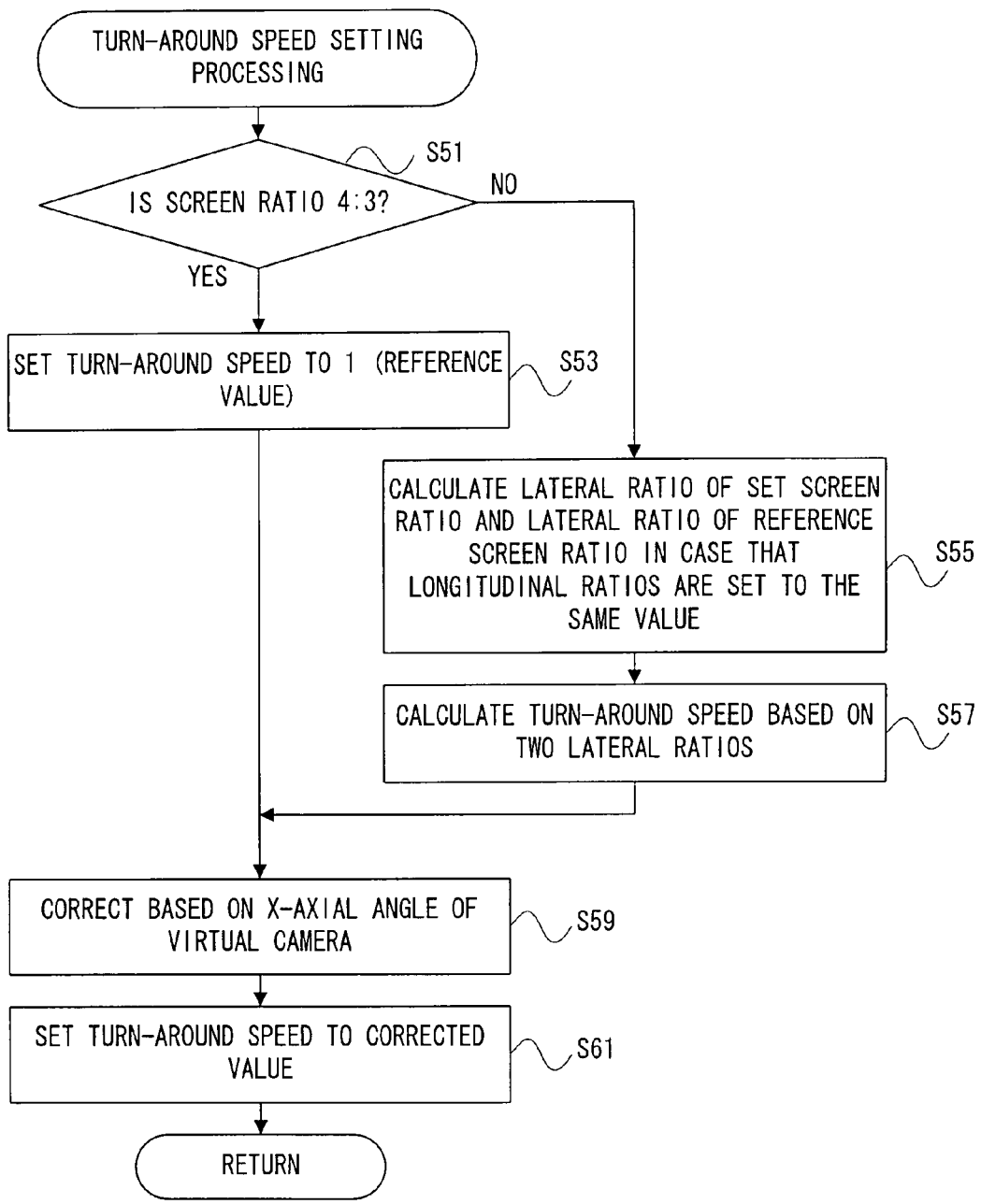
FIG. 9 is a flowchart showing an example of the operation of a turn-around speed setting processing in FIG. 7.

In a step S51 of FIG. 9, the CPU 36 determines whether or not the screen ratio stored in the memory area 90 is 4:3. If "YES" in the step S51, namely, in a case of the normal screen, the CPU 36 sets 1 (reference value) as the turn-around speed in a step S53. Specifically, the reference value is stored in the turn-around speed (X-axial component) of the camera parameter memory area 92.

In this way, in this exemplary embodiment, the normal screen with screen ratio of 4:3 is adopted as the screen as a reference, and an optimum turn-around speed in a reference screen defined by a game producer is adopted as a reference value. Then, the turn-around speed corresponding to the screen ratio different from the reference screen ratio (the turn-around speed for a wide screen in this exemplary embodiment) is calculated based on the reference value.

However, in this exemplary embodiment, the reference value is determined based on a reference image when the X-axial angle of the virtual camera is 0 degree, namely, when the direction of the virtual camera (Z-axis) is parallel to a horizontal direction in the world coordinates system. Note that the reference value may be determined based on the reference image when the X-axial angle of the virtual camera is a prescribed angle.

Meanwhile, if "NO" in the step S51, namely, in a case of the wide screen, a crosswise visual field is wider than that of the normal screen as a reference, and therefore the turn-around speed is made slower than that of the reference screen. Specifically, the CPU 36 calculates the lateral ratio of the set screen ratio and the lateral ratio of the reference screen ratio, in a case that longitudinal ratios of the set screen ratio and the reference screen ratio are set to the same value. Specifically, in this exemplary embodiment, the longitudinal ratios of the set screen ratio 16:9 and the reference screen ratio 4:3 are set to the same value 9. At this time, the lateral ratio of the set screen ratio is 16 without change, and the lateral ratio of the reference screen ratio is 12.

Then, in a step S57, the CPU 36 calculates the turn-around speed based on two lateral ratios. Specifically, in this exemplary embodiment, ratios of the lateral ratio 12 of the reference screen ratio and the lateral ratio 16 of the set screen ratio are converted into the ratios of the turn-around speed (reference value 1) in the reference screen ratio and the turn-around speed in the set screen ratio. Namely, the ratios of 12 and 16 are calculated, and this calculated value 0.75 (12/16) is adopted as the turn-around speed in the set screen ratio. In this way, by a simple processing based on the lateral ratios of an image to be displayed and a reference image, the turn-around speed suitable for the screen ratio can be calculated.

Subsequently, in a step S59, the CPU 36 executes correction based on the X-axial angle of the virtual camera. The X-axial angle is changed in accordance with a game situation such as position of the player character, position of the gazing point, or position of the view point. By the X-axial angle, difficulty in observing the image is changed, when the virtual camera turns around. Accordingly, by executing this correction, more appropriate turn-around speed can be set, in accordance with various situations such as looking down on, looking up, or horizontally observing the gazing point by the virtual camera.

Figure 10:
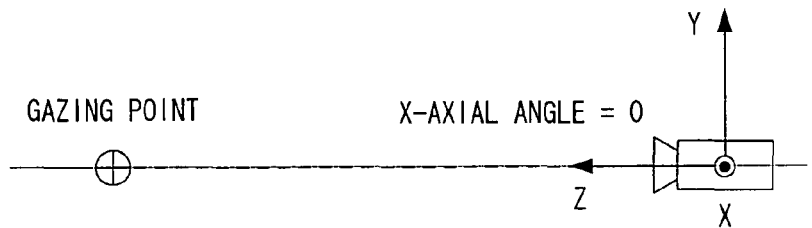
Figure 10:
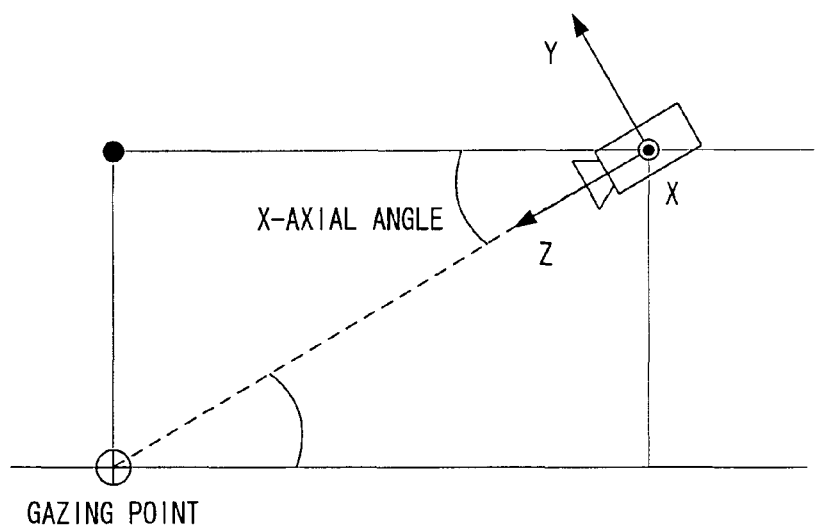

The X-axial angle of the virtual camera is shown in FIG. 10. FIG. 10(A) shows a case of horizontally setting the visual point and the gazing point, namely, setting the X-axial angle at 0 degree. FIG. 10(B) shows a case where the view point looks down on the gazing point, and the X-axial angle is larger than 0 degree and smaller than 90 degrees. In a case of FIG. 10(B), for example, the virtual camera performs turn-around while maintaining the X-axial angle, namely, rotates in a horizontal plane, with an intersection point of a vertical line from the gazing point and a horizontal line from the view point set as a center.

The reference value 1 of the turn-around speed of the reference normal screen is the value when the X-axial angle as shown in FIG. 10(A) is 0 degree, and the turn-around speed 0.75 calculated in the aforementioned step S57 is the value when the X-axial angle is 0 degree. The degree of difficulty of observing the image by turn-around is highest when the X-axial angle is 0 degree as shown in FIG. 10(A), and becomes lower as the degree of the X-axial angle becomes larger. Accordingly, in accordance with the X-axial angle, the turn-around speed is corrected. When the X-axial angle is 0 degree, the difficulty in observing the game image is highest, and therefore the turn-around speed is set smallest. As the degree of the X-axial angle approaches 90 degrees, the game image is easily observed and therefore the turn-around speed is set large.

Figure 11:
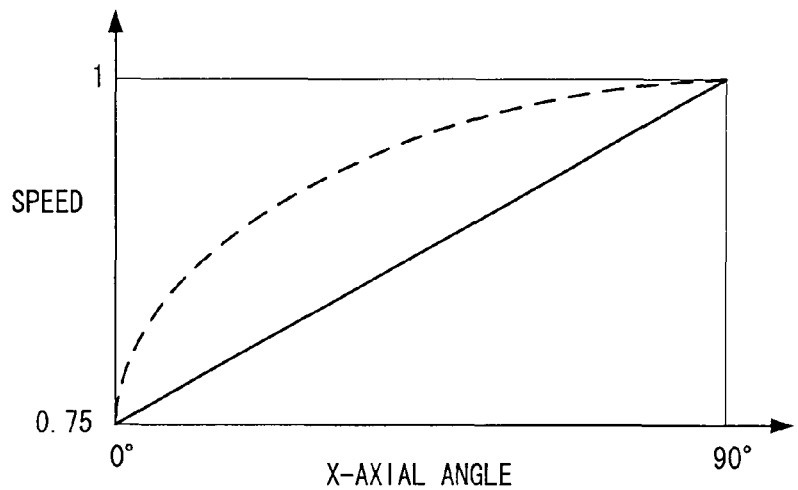
FIG. 11 is an illustrative view showing an example of a relation between the X-axial angle of the virtual camera and the turn-around speed for the wide screen.

FIG. 11 shows an example of a relation between the X-axial angle of the virtual camera and the turn-around speed for the wide screen. When the X-axial angle is 0 degree, it is most difficult to observe the game image, and as the X-axial angle is set larger, the game image is more easily observed. Therefore, the turn-around speed is set smallest when the X-axial angle is 0 degree, and as the degree of the X-axial angle is set larger, the turn-around speed is set large. Specifically, the turn-around speed for the wide screen (when the turn-around speed for the normal screen is set as 1) is 0.75 when the X-axial angle is 0 degree, and approaches 1 as the degree of the X-axial angle approaches 90 degrees. For example, the turn-around speed linearly changes against the X-axial angle as shown by solid line in FIG. 11. In addition, in other exemplary embodiments, the turn-around speed for the wide screen may curvedly change against the X-axial angle as shown by broken line in FIG. 11. Note that although the relation between the turn-around speed for the normal screen and the X-axial angle is not shown, the turn-around speed for the normal screen and the X-axial angle have a prescribed relation as is shown in a case of the wide screen shown in FIG. 11.

In the step S59 of FIG. 9, a corrected value of the turn-around speed can be calculated from the X-axial angle, in accordance with a prescribed relation formula previously stored. Note that a table showing the turn-around speed corresponded to the X-axial angle is previously stored, and by referencing this table, the corrected value may be read.

Then, in a step S61, the CPU 36 sets the corrected value to the turn-around speed. Specifically, the corrected value is stored in the turn-around speed of the camera parameter memory area 92 (X-axial component).

In addition, when the X-axial angle is fixed to a prescribed value (except for 0 degree) in other exemplary embodiments, the corrected value previously calculated and stored may be set to the turn-around speed.

Also, in other exemplary embodiments, when an influence applied on the difficulty in observing by the X-axial angle is not large, the correction by the X-axial angle may not be performed.

Further, in other exemplary embodiments, in the same way as the turn-around speed of the reference screen, it may be constructed so that the game producer acquires a sensory appropriate value for the turn-around speed of a screen that is not a reference, and this appropriate value is previously stored, and then the turn-around speed is set.

When the turn-around speed setting processing of FIG. 9 is ended, the process returns to a step S15 of FIG. 7. In the step S15, the CPU 36 executes a game processing based on the operation by the player. For example, the CPU 36 acquires the input data from the controller 22, and based on this input data, executes the control of movement and action of the player character and executes the control of the virtual camera. Note that the game processing of the step S15 and the processing of a step S17 to S25 as will be described later are executed for each 1 frame.

Then, in the step S17, the CPU 36 determines whether or not it is the timing of the turn-around timing of the virtual camera. For example, the CPU 36 determines whether or not the operation is performed to invert the direction of the player character based on the input data from the controller 22, and determines whether or not a prescribed condition is satisfied in game progressing situation where the virtual camera is required to turn-around, or determines whether or not the operation is performed to indicate the turn-around of the virtual camera based on the input data.

If "NO" in the step S17, the process advances to a step S25. Note that although not shown in FIG. 7, when it is determined so that it is not the turn-around timing of the virtual camera, image generation processing similar to that of the step S39 and display processing similar to that of the step S41 of FIG. 8 are executed before the processing of the step S25 so as to display the game image according to a result of the game processing of the step S15.

Meanwhile, if "YES" in the step S17, in a step S19, the CPU 36 executes the turn-around processing based on the turn-around speed. Specifically, the CPU 36 calculates the position where the virtual camera is supposed to turn around at the turn-around speed, and this position is stored in the camera parameter memory area 92 as a new position of the view point.

Subsequently, in a step S21, the CPU 36 executes the image generation processing based on the turn-around processing by using a GPU 42. Specifically, based on the view angle, a gazing point, and the view point stored in the camera parameter memory area 92, the game image showing the virtual game space inside the visual field corresponding to the screen ratio is generated. Then, in a step S23, the CPU 36 executes display update processing by using the GPU. Thus, the generated game image is displayed on the monitor 34.

By continuously executing the aforementioned processing of the steps S21 and S23 for a prescribed time period, movement (change) of the image according to the turn-around of the virtual camera is expressed.

In the step S25, the GPU 36 determines whether or not the game is finished. For example, it determines whether or not the condition for finishing the game is satisfied. If "NO" in the step S25, the process returns to the step S15, and the game is continued. Meanwhile, if "YES" in the step S25, the game is finished.

According to this exemplary embodiment, the screen ratio of the game image to be displayed is acquired, and in accordance with this screen ratio, the turn-around speed of the virtual camera is changed, and therefore the turn-around speed of the virtual camera suitable for the screen ratio can be set. Accordingly, the game image generated when the virtual camera is turned around can be made easy to be observed.

Note that in the aforementioned exemplary embodiment, as shown in FIG. 4, the crosswise view angle of the virtual camera is set so that the visual field in the crosswise direction of the screen is different in accordance with the screen ratio. If the moving speed of the virtual camera when it turns around in the crosswise direction is set without considering the screen ratio, difficulty in observing the crosswise edge portion of the game image is unfavorably generated. Therefore, the crosswise turn-around speed (X-axial component) of the virtual camera is changed in accordance with the screen ratio. However, in other exemplary embodiments, when a lengthwise view angle of the virtual camera (Y-axial direction) is set so that the visual field in a lengthwise direction of the screen is different in accordance with the screen ratio, a possibility in this case is that the difficulty in observing the game image is generated in a lengthwise edge portion of the game image, by the turn-around of the virtual camera in the lengthwise direction. Therefore, the lengthwise turn-around speed (Y-axial component) of the virtual camera is changed in accordance with the screen ratio. In addition, the lengthwise turn-around speed can be calculated based on the longitudinal ratio of the set screen ratio and the longitudinal ratio of the reference screen ratio, when the lateral ratios of the set screen ratio and the reference screen ratio are set to the same value.

In the aforementioned exemplary embodiments, the moving speed of the virtual camera when it is turned around is changed in accordance with the screen ratio. However, in other exemplary embodiments, even if the virtual camera performs a movement other than the movement of turn-around, the moving speed of the virtual camera may be changed in accordance with the screen ratio. If the visual field of the virtual camera is different according to the screen ratio, the change in the visible range (photographic range) by the movement of the virtual camera is different. Therefore, by setting the moving speed in accordance with the screen ratio, the change of the visible range and the movement of the image can be made easy to be observed. For example, by determining the kind of the movement (movement of turn-around, parallel movement in a prescribed direction, etc.) when the virtual camera is moved, a suitable moving speed may be set in accordance with this kind.

In the aforementioned each exemplary embodiment, explanation is given to a case where the screen ratio is 4:3 and 16:9. However, needless to say, each exemplary embodiment can also be applied to a case of other various screen ratios.

Although certain exemplary embodiments have been described and illustrated in detail, it is clearly understood that the same is by way of illustration and example only and is not to be taken by way of limitation, the spirit and scope of certain exemplary embodiments being limited only by the terms of the appended claims.

What is claimed is:

1. A non-transitory storage medium storing a game program executed in a computer of a game apparatus for displaying on a display a scene viewed from a virtual camera moving in a virtual space, wherein
said game program makes said computer execute:
acquiring an aspect ratio of an image to be displayed on said display;
setting a moving speed of said virtual camera based on said aspect ratio;
controlling a movement of said virtual camera based on said moving speed; and
generating an image showing a range of a visual field of said controlled virtual camera.

2. A non-transitory storage medium storing a game program according to claim 1, wherein
a turn-around speed is set as said moving speed of said virtual camera based on said aspect ratio, and
a turn-around of said virtual camera is controlled based on said turn-around speed.

3. A non-transitory storage medium storing a game program according to claim 1, wherein
said game program makes said computer further execute setting said visual field in a crosswise direction different based on said aspect ratio, and
a crosswise moving speed of said virtual camera is set based on said aspect ratio.

4. A non-transitory storage medium storing a game program according to claim 3, wherein
said crosswise moving speed is set so that a value thereof becomes smaller as a ratio of lateral to longitudinal of said image increases.

5. A non-transitory storage medium storing a game program according to claim 4, wherein
setting a moving speed of said virtual camera includes calculating lateral ratios of said image and a reference image, when longitudinal ratios of said image, said acquired aspect ratio thereof, and said reference image are set to a same value, and calculates said crosswise moving speed based on said calculated two lateral ratios.

6. A non-transitory storage medium storing a game program according to claim 3, wherein
setting a moving speed of said virtual camera further includes correcting said crosswise moving speed set based on said aspect ratio, based on a lengthwise angle of said virtual camera.

7. A non-transitory storage medium storing a game program according to claim 1, wherein
said game program further makes said computer execute setting a view angle defining said visual field of said virtual camera based on said aspect ratio.

8. A game apparatus for displaying on a display a scene viewed from a virtual camera moving in a virtual space, comprising:
a computer system, comprising at least one computer processor, the computer system being configured to:
acquire an aspect ratio of an image to be displayed on said display;
set a moving speed of said virtual camera based on said aspect ratio;
control a movement of said virtual camera based on said moving speed; and
generate an image showing a range of a visual field of said virtual camera controlled by said movement.

* * * * *